UNITED STATES PATENT OFFICE.

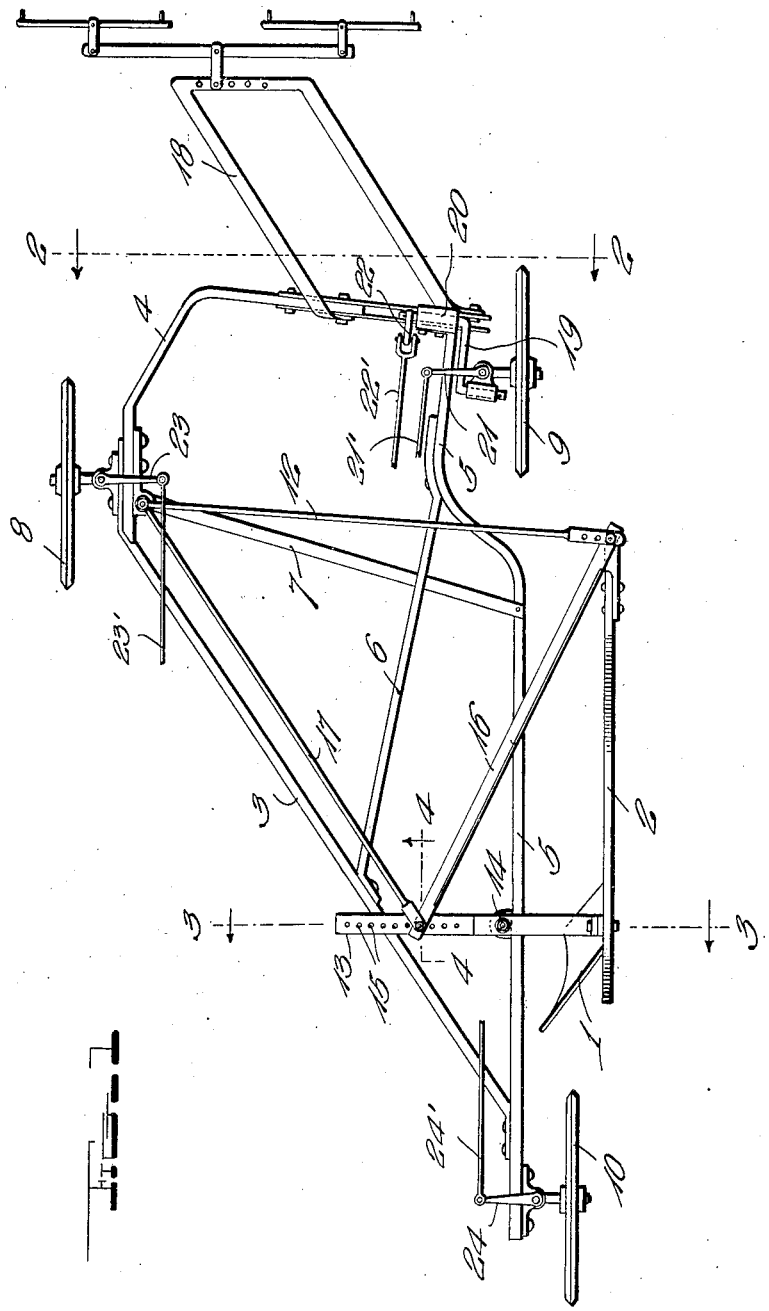

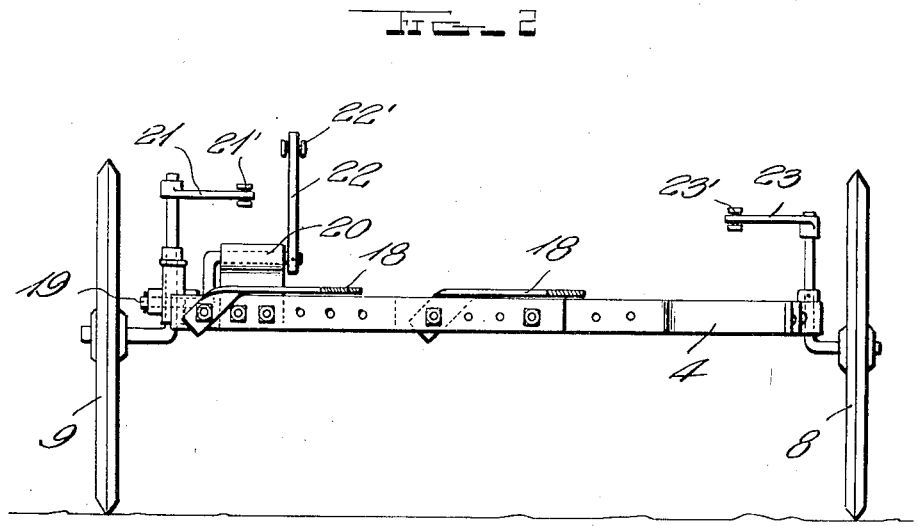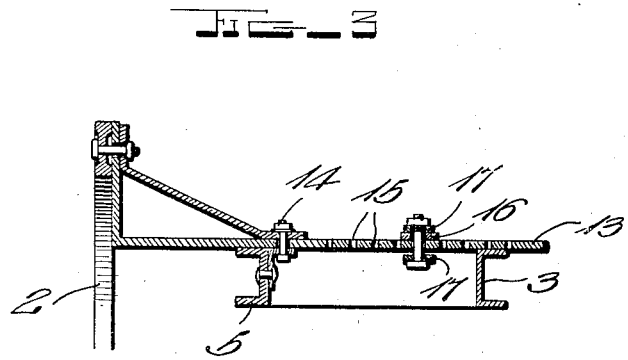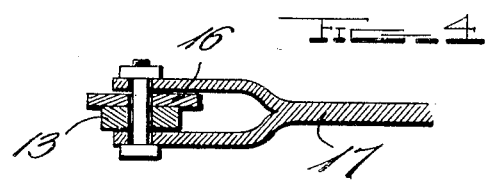

GEORGE ALFORD, OF MEDFORD, OREGON.

PLOW.

1,355,375.   Specification of Letters Patent.   Patented Oct. 12, 1920.

Application filed June 18, 1917. Serial No. 175,463.

*To all whom it may concern:*

Be it known that I, GEORGE ALFORD, a citizen of the United States, residing at Medford, in the county of Jackson and State of Oregon, have invented certain new and useful Improvements in Plows, of which the following is a specification.

My present invention pertains to plows, and contemplates the provision in a wheel plow of means whereby the team may be disposed a considerable distance at one side of the line of travel of the plow without giving rise to side pull, this in order to enable an operator to plow very close to tree trunks without liability of the team breaking limbs of the trees or knocking fruit therefrom.

To the attainment of the foregoing the invention consists in a peculiarly simple and efficient combination of draft bars, as hereinafter described and claimed; a left-hand plow being employed when soil is to be plowed from the tree trunks and a right-hand plow when soil is to be plowed toward the trunks.

In the accompanying drawings which are hereby made a part hereof:

Figure 1 is a plan view showing a wheel plow embodying my invention.

Figs. 2 and 3 are sections on the lines 2—2 and 3—3, respectively, of Fig. 1.

Fig. 4 is an enlarged detail section on line 4—4 of Fig. 1.

Similar numerals of reference designate corresponding parts in all of the views of the drawings.

The plow 1 and its beam 2 are located at one side of the main frame which is made up of the bars 3, 4 and 5 and the braces 6 and 7, fixedly connected together and supported by the forward wheels 8 and 9 and the rear wheel 10, relatively arranged as best shown in Fig. 1. The plow 1 and its beam 2 are retained in proper working position with respect to the main frame by a forward brace 12 and a lateral inwardly-extending bar 13; the latter being pivotally connected at 14 to the main frame bar 5, so as to have a limited movement relatively to said frame bar 5 and being fixed at one end to the beam 2 and having its opposite end free and adjacent to the main frame bar 3 as shown. At intervals of its length said bar 13 is provided with apertures 15 for purposes of adjustment as hereinafter set forth. The brace 12 is assisted in holding the forward end of the plow beam 2 in proper working position by the draft bar 16, the said bar 16 being pivotally connected to the front end of the beam 2 and being pivotally and adjustably connected to the bar 13 by a bolt that is disposed in one of the apertures 15 thereof. In operation the draft bar 16 serves to push the plow forwardly and the brace 12 functions by preventing movement of the beam 2 at right angles to the line of travel, and incidentally a third bar 17, connected at one end to the transverse bar 13 (and when in the position shown in Fig. 1 also to the draft bar 16) and at its opposite end to the end of the brace 12 remote from the beam 2, serves to take a side draft which otherwise would have a tendency to move the main frame laterally or sidewise. The said bar 17 is adjustable in common with the rear end of the draft bar 16. I would have it understood at this point that when the main frame is drawn forwardly, the plow 1 moving in the ground tends to move the draft bar 16 endwise rearwardly and this tendency is overcome by the bar 17; the strain on said bar 17 serving to pull the main frame rearwardly at the point where the forward end of the bar 17 is connected to the main frame, with the result that the main frame is caused to travel in a line parallel to the line of power.

At 18 is a forwardly extending bail-shaped draft board for the attachment of the draft animals or tractor employed to draw the plow. The position of the point of power is adjustable, and it will be manifest that the bars described for taking the side draft on the frame render it feasible to attach the draft means at a considerable distance, from three to three and a half feet, to the left of the forward end of the beam 2.

In operation the rear wheel 10 serves as a tiller when the plow is turned, and the wheel 9 incidental to forward movement of the machine gages the width of the furrow turned by the plow; also, the wheels 8 and 9 serve in the guiding of the plow.

The wheel 8 is mounted on a spindle carried by a crank 23 that is journaled in the frame; said crank being connected to a rod 23' that is designed to be connected with the usual hand lever (not shown). Likewise the wheel 9 is mounted on and carried by a crank 21, connected to a rod 21' for connection with a hand lever (not shown). Said crank 21 is mounted in a bracket mounted on a crank 19, journaled in a bracket 20, adjustable transversely on the forward bar of the frame; the said cranks 21 and 19 being connected to rods 21' and 22—22', respectively, and the rods being designed to be connected to hand levers (not shown). It is to be understood that the said hand levers are mounted on the frame and are equipped with the conventional means whereby they may be adjustably fixed in position to adjustably fix the parts with which they are connected. Said hand levers, however, as well as the connections thereof are not of the essence of my invention, and any other suitable means may be employed for the purposes stated without involving departure from the scope of my invention as claimed.

Having described my invention, what I claim and desire to secure by Letters Patent, is:

1. The combination in a wheeled plow, of a wheel-supported main frame, a plow and its beam located at one side of the main frame, a transverse bar fixedly connected to the plow beam and extending inwardly therefrom and pivotally connected at an intermediate point of its length to a fixed point on the adjacent main frame bar, a draft bar pivotally connected at its rear end to the inner arm of the transverse bar and pivotally connected at its forward end to the forward end of the plow beam, another bar connected at its rear end to the inner arm of the transverse bar and the rear end of the draft bar and at its forward end to the portion of the frame at the side of the machine remote from the plow and its beam, a transverse bar pivotally connected at one end to the frame and at its opposite end to the forward ends of the draft bar and plow beam, and means for attaching draft means to the forward portion of the main frame at a distance from the line of travel of the plow.

2. The combination in a wheeled plow, of a wheel-supported main frame, a plow carried by a plow beam located at one side of the main frame, a transverse bar fixedly connected to the plow beam and extending inwardly therefrom and pivotally connected at an intermediate point of its length to the adjacent main frame bar, a draft bar pivotally connected at its rear end to the inner arm of the transverse bar and pivotally connected at its forward end to the forward end of the beam, a bar pivotally connected at its rear end to the inner arm of the transverse bar and the rear end of the draft bar and at its forward end to the portion of the frame at the side of the machine remote from the plow and its beam, a transverse bar pivotally connected at one end to said frame portion and at its opposite end to the forward ends of the draft bar and plow beam, and a bail-shaped draft board connected to and extending forwardly from the forward end of the main frame at one side of and spaced from the line of travel of the plow and laterally in a direction away from said line.

3. The combination in a wheeled plow, of a wheel supported main frame, a plow and its beam located at one side of the main frame, draft means attached to the forward portion of the main frame at one side of and spaced from the line of travel of the plow, a transverse bar fixed to the plow beam and pivotally connected at an intermediate point of its length to the main frame, a draft bar pivotally connected to the inner arm of said transverse bar and the forward end of the beam, an inner bar pivotally connected to the transverse bar and the draft bar and extending forwardly and inwardly therefrom and pivotally connected at its forward portion to the side of the main frame remote from the plow and beam, and a forward transverse bar pivotally connected at one end to the forward ends of the beam and draft bar and pivotally connected at its opposite end to the forward end of the inner bar and the portion of the main frame remote from the plow and plow beam.

4. In a wheeled plow, the combination of a rigid frame supported on wheels, a plow beam, a plow rigidly attached to said beam, a bar, said bar being rigidly connected to the plow beam adjacent to the plow which bar is pivotally connected to said frame, a brace from a point on the length of said bar to a point on the length of said beam remote from the plow, an adjustable brace from a point on the plow beam remote from the plow to a fixed point on the rigid frame, and a brace connecting a point in the length of the bar to a fixed point on the rigid frame.

In testimony whereof I affix my signature.

GEORGE ALFORD.